United States Patent
Parrish et al.

(10) Patent No.: US 6,550,016 B1
(45) Date of Patent: Apr. 15, 2003

(54) PROTECTION BUS AND METHOD FOR A TELECOMMUNICATIONS DEVICE

(75) Inventors: Brent K. Parrish, Hollis, NH (US); John P. Barry, Auburn, NH (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/327,971

(22) Filed: Jun. 8, 1999

(51) Int. Cl.[7] .............................................. H02H 3/05
(52) U.S. Cl. ............................................. 714/4; 6/43
(58) Field of Search ........................... 714/4, 6, 11, 43, 714/44, 56; 710/100, 102, 103, 108; 370/216, 489

(56) References Cited

U.S. PATENT DOCUMENTS

| | | | | |
|---|---|---|---|---|
| 4,847,837 A | * | 7/1989 | Morales et al. ............. | 370/222 |
| 4,964,120 A | * | 10/1990 | Mostashari ................. | 370/228 |
| 5,016,244 A | * | 5/1991 | Massey et al. .............. | 370/217 |
| 5,377,205 A | * | 12/1994 | Shi ............................ | 375/357 |
| 5,519,704 A | | 5/1996 | Farinacci et al. ........ | 370/85.13 |
| 5,544,310 A | * | 8/1996 | Forman et al. .............. | 714/31 |
| 5,596,569 A | * | 1/1997 | Madonna et al. ............ | 340/2.2 |
| 5,781,715 A | * | 7/1998 | Sheu ......................... | 370/217 |
| 5,787,070 A | | 7/1998 | Gupta et al. ................. | 370/217 |
| 5,835,481 A | | 11/1998 | Akyol et al. ................. | 370/216 |
| 5,859,959 A | * | 1/1999 | Kimball et al. .............. | 370/216 |
| 5,923,643 A | * | 7/1999 | Higgins et al. .............. | 370/218 |
| 6,005,841 A | * | 12/1999 | Kicklighter ................. | 370/217 |
| 6,131,169 A | * | 10/2000 | Okazawa et al. ........... | 370/217 |
| 6,425,009 B1 | * | 7/2002 | Parrish et al. .............. | 370/216 |
| 6,434,703 B1 | * | 8/2002 | Parrish et al. .............. | 710/301 |

* cited by examiner

Primary Examiner—Dieu-Minh Le
(74) Attorney, Agent, or Firm—Baker Botts L.L.P.

(57) ABSTRACT

A telecommunications device includes a protection bus, at least one protected card, and an I/O module for the protected card. The I/O module is coupled to the protected card and the protection bus and communicates data between the protected card and an associated network interface. The device also includes at least one protection card and a protection I/O module for the protection card. The protection I/O module is coupled to the protection card and to the protection bus and is capable of assuming at least some responsibilities of the protected card in response to a failure of the protected card. The protection I/O module will then communicate the data between the protection card and the I/O module for the protected card using the protection bus. The I/O module for the protected card communicates the data with the network interface associated with the protected card to protect the device from the failure of the protected card.

25 Claims, 4 Drawing Sheets

TO FIG. 3B

PROTECTION BUS AND METHOD FOR A TELECOMMUNICATIONS DEVICE

RELATED APPLICATIONS

This application is related to:

U.S. application Ser. No. 09/328,171 for a "LOCAL AREA NETWORK AND MESSAGE PACKET FOR A TELECOMMUNICATIONS DEVICE," filed Jun. 8, 1999, currently pending;

U.S. application Ser. No. 09/328,038 for a "HIGH AVAILABILITY LOCAL AREA NETWORK FOR A TELECOMMUNICATIONS DEVICE," filed Jun. 8, 1999, now U.S. Pat. No. 6,425,009;

U.S. application Ser. No. 09/327,700 for a "TDM SWITCHING SYSTEM AND ASIC DEVICE," filed Jun. 8, 1999, currently pending;

U.S. application Ser. No. 09/328,173 for a "EVENT INITIATION BUS AND ASSOCIATED FAULT PROTECTION FOR A TELECOMMUNICATIONS DEVICE," filed Jun. 8, 1999, now U.S. Pat. No. 6,434,703;

U.S. application Ser. No. 09/328,031 for a "FRAME SYNCHRONIZATION AND FAULT PROTECTION FOR A TELECOMMUNICATIONS DEVICE," filed Jun. 8, 1999, currently pending;

U.S. application Ser. No. 09/328,172 for a "TRANSITIONING A STANDARDS-BASED CARD INTO A HIGH AVAILABILITY BACKPLANE ENVIRONMENT," filed Jun. 8, 1999, currently pending; and U.S. application Ser. No. 09/330,433 for a "CLOCK SYNCHRONIZATION AND FAULT PROTECTION FOR A TELECOMMUNICATIONS DEVICE," filed Jun. 8, 1999, currently pending.

TECHNICAL FIELD OF THE INVENTION

This invention relates to the field of telecommunications, and more particularly to a protection bus and method for a telecommunications device.

BACKGROUND OF THE INVENTION

Many telecommunications devices include backplanes for transmitting digital information between components of the devices. For example, a telecommunications switching system might include a backplane for transmitting digital data representing voice signals between cards associated with incoming and outgoing ports. Typically, such a system would also include one or more mechanisms to allow the system to continue functioning, at least in part, despite the failure of a card or its inability to communicate with an associated telecommunications network interface. Successful operation of the system in many instances depends heavily upon the ability of these protection mechanisms to meet the often stringent availability, flexibility, and other requirements placed on the system.

As the telecommunications industry continues to dominate the growth of the global economy, meeting availability, flexibility, and other requirements placed on switching and other systems has become increasingly important. High availability is generally considered as exceeding 99.999 percent availability, amounting to less than approximately five minutes of "down time" per year, and generally requires a system to have the ability to autonomously handle certain faults, such as failure of a card or other component, without immediate human intervention. High availability has increasingly become a de facto if not explicit competitive requirement for many telecommunications manufacturers.

However, previous protection techniques are often inadequate to meet these requirements. As the density of cards within telecommunications devices continues to increase, preventing a single card failure from removing one or more other cards from service becomes increasingly important. For example, with previous techniques, the failure of one card in a switching system having twenty-four cards might result in 96 communications channels being lost if each card supports four ports, lines, trunks, or other network interfaces, while failure of a card supporting sixteen network interfaces might cause 512 channels to be lost. Since it is undesirable to allow single points of failure to propagate in high availability environments, deficiencies of prior protection techniques are particularly apparent when they are incorporated within high availability backplane environments of telecommunications devices.

SUMMARY OF THE INVENTION

According to the present invention, disadvantages and problems associated with protection strategies within a backplane environment of a telecommunications device have been substantially reduced or eliminated.

According to one embodiment of the present invention, a telecommunications device includes a protection bus, at least one protected card, and an I/O module for the protected card. The I/O module is coupled to the protected card and the protection bus and communicates data between the protected card and an associated network interface. The device also includes at least one protection card and a protection I/O module for the protection card. The protection I/O module is coupled to the protection card and the protection bus and is capable of assuming at least some responsibilities of the protected card in response to a failure of the protected card. The protection I/O module will then communicate the data between the protection card and the I/O module for the protected card using the protection bus. The I/O module for the protected card communicates the data with the network interface associated with the protected card to protect the device from the failure of the protected card.

The protection bus and related components of the present invention provide a number of important technical advantages over prior protection strategies, particularly within a high availability backplane environment of a telecommunications device. The present invention provides multiple layers of fault protection, including both detection and handling of faults associated with cards within the device, helping to prevent single points of failure from propagating within the device, reduce down time, and satisfy high availability requirements. As a result of these and other advantages, the protection bus and related components of the present invention are well suited for incorporation in a variety of switching and other modern telecommunications devices. Other important technical advantages are apparent to those skilled in the art.

BRIEF DESCRIPTION OF THE DRAWINGS

To provide a more complete understanding of the present invention and further features and advantages thereof, reference is now made to the following description taken in conjunction with the accompanying drawings, in which.

DETAILED DESCRIPTION OF THE INVENTION

Figure 1:
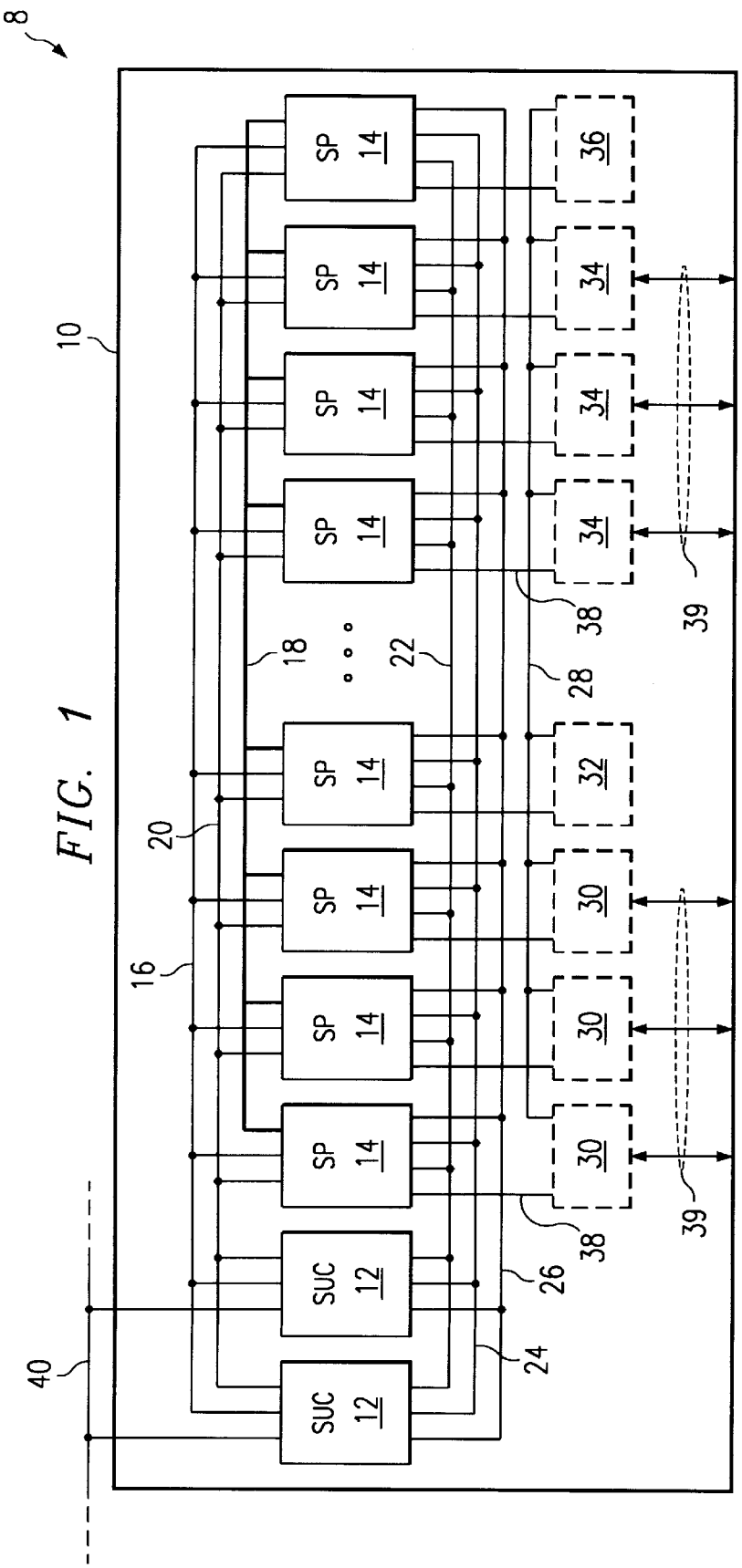
FIG. 1 illustrates an exemplary system including at least one switching unit having a protection bus according to the present invention.

FIG. 1 illustrates an exemplary system 8 including one or more switching units 10. In one embodiment, each switching unit 10 is a programmable switching unit that switches time division multiplexed (TDM), packet-based, or other suitable digital signals associated with voice, data, or other appropriate traffic between incoming and outgoing ports, lines, trunks, or other suitable telecommunications network interfaces. In general, switching unit 10 may operate at least part subject to the control of suitable software within one or more associated host computers and may be coupled to the host computers using one or more suitable communications links. Although switching unit 10 is discussed, those skilled in the art appreciate that the present invention may apply similarly to a wide variety of other telecommunications devices and that the present invention is intended to encompass all such applications.

In one embodiment, switching unit 10 includes two or more redundant switching unit controllers (SUC) 12 coupled to one another and to multiple service providers (SP) 14 using a control bus 16. Switching unit controllers 12 and service providers 14 are cards that support appropriate integrated circuits, buses, circuitry, and any other suitable electrical components and may be shelf-mounted, rack-mounted, or otherwise removably installed within switching unit 10 according to particular needs. Switching unit controllers 12 generally control higher level aspects of the operation of service providers 14 and other components within switching unit 10. Service providers 14 communicate digital signals with one another using a backplane, midplane, or other switching fabric 18 that in a particular embodiment supports up to 16,384 time slots, corresponding to as many as 16,384 ports. Service providers 14 generally communicate between backplane 18 and suitable telecommunications network interfaces to allow switching unit 10 to communicate information with and switch digital signals associated with these interfaces. Service providers 14 may communicate with network interfaces of a single or multiple types within a particular switching unit 10, for example and not by way of limitation, T1 interfaces, E1 interfaces, Integrated Services Digital Network (ISDN) interfaces, Signaling System 7 (SS7) interfaces, Optical Carrier level-3 (OC-3), or any other suitable interfaces, in any combination. Service providers 14 may have a peer-to-peer or any suitable hierarchical relationship. Switching unit controllers 12 and service providers 14 may be hot insertable, hot pluggable, hot swappable, or otherwise readily replaceable during operation of switching unit 10 to further support high availability requirements.

In general, switching unit controllers 12 and service providers 14 use control bus 16 to communicate appropriate command, control, and administrative messages with one another during operation of switching unit 10. Control bus 16 and its associated physical layer protocol provide a local area network coupling switching unit controllers 12 and service providers 14 in the backplane environment of switching unit 10, which in one embodiment is a high availability backplane environment. Control bus 16 and its operation are described more fully in U.S. Pat. No. 6,425,009 and copending U.S. application Ser. No. 09/328,171. In addition to control bus 16, switching unit controllers 12 and service providers 14 may be coupled using a suitable combination of synchronization bus 20, power bus 22, reset bus 24, and isolation bus 26 according to particular needs.

Each service provider 14 is coupled to an associated input/output (I/O) module 30, 32, 34, or 36, as described more fully below with reference to FIG. 2. I/O modules 30 and 34 generally support incoming and outgoing communications between associated service providers 14 and associated network interfaces over associated links 39. In a particular embodiment, I/O modules 30, 32, 34, and 36 may support up to 2048 Digital Signal level Zero (DS0) channels, although the present invention contemplates I/O modules 30, 32, 34, and 36 supporting any suitable number of channels of any type according to particular needs. Protection bus 28 couples I/O modules 30, 32, 34, and 36 to one another and generally operates within switching unit 10 to provide protection switching and other capabilities desirable in satisfying high availability requirements. In one embodiment, I/O modules 30, 32, 34, and 36 are trunk interface cards and service providers 14 are associated controller cards for the trunk interface cards. Since service providers 14 incorporate control logic and other functionality suitable for controlling operation of the trunk interface cards, failures of service providers 14 typically occur more often than failure of trunk interface cards and should therefore be protected against where high availability is a goal.

One or more switching unit controllers 12 within a particular switching unit 10 may be coupled using network 40 to one or more switching unit controllers 12 within other switching units 10, one or more associated host computers, or one or more other network components, in any suitable combination. Network 40 may be a shared or dedicated local area network (LAN) supporting Ethernet or any other communications protocol, a suitable wide area network (WAN), or any other appropriate network. In one embodiment, network 40 supports a secure 100BaseT Ethernet link and one or more higher level protocols, for example, TCP/IP (Transmission Control Protocol/Internet Protocol), UDP/IP (User Datagram Protocol/Internet Protocol), or any other suitable protocol. A service provider 14 needing to communicate with a service provider 14 located in another switching unit 10 does so using one of its associated switching unit controllers 12 as a gateway to network 40. Switching unit controller 12 will collect and buffer message packets from service provider 14, reformat the message packets as appropriate, and transmit the message packets to a switching unit controller 12 in the switching unit 10 associated with the destination service provider 14.

Figure 2:
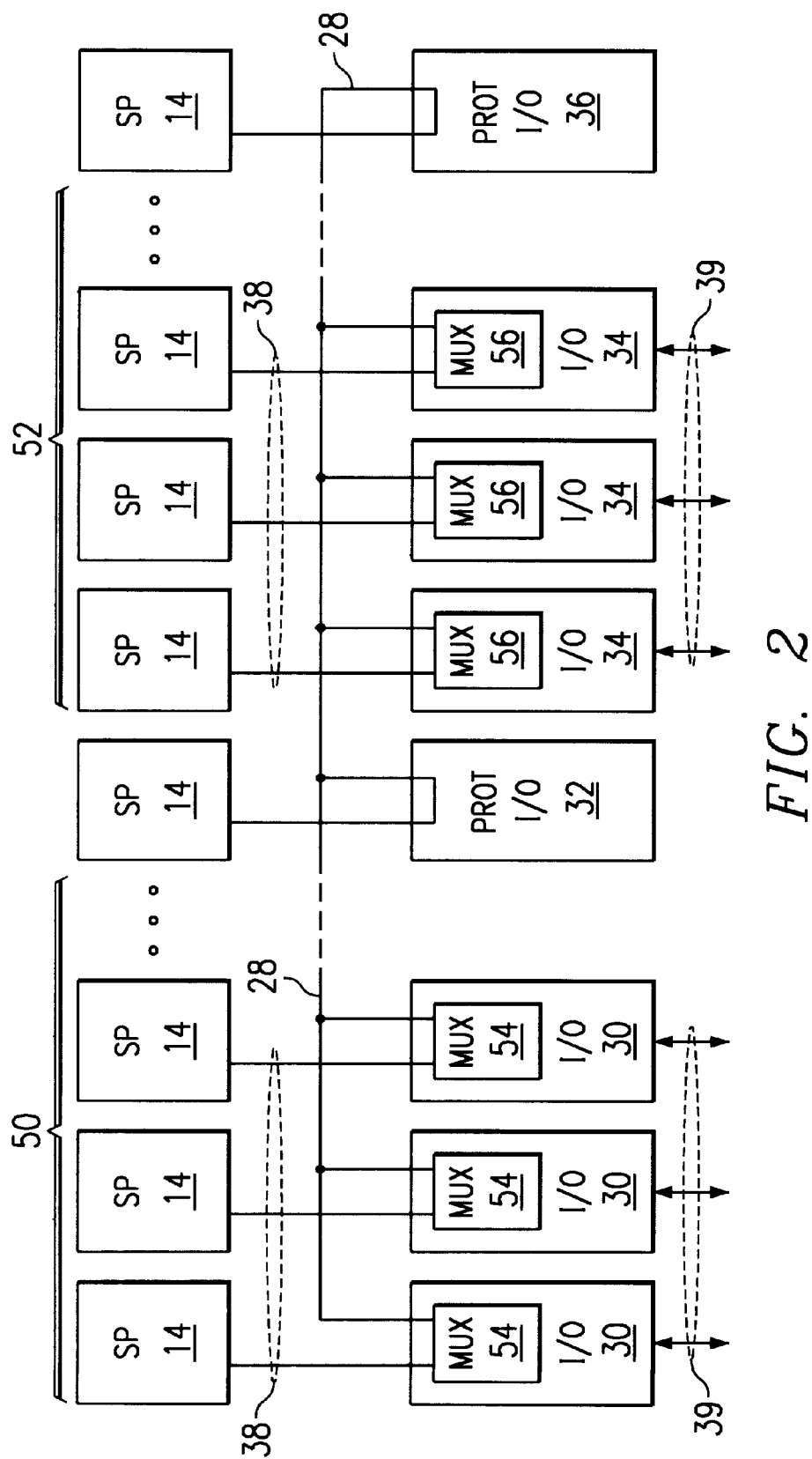
FIG. 2 illustrates in further detail an exemplary protection bus and related components within a switching unit according to the present invention.

FIG. 2 illustrates in further detail protection bus 28 and selected related components in switching unit 10. For clarity, switching unit controllers 12 and other selected components are omitted from FIG. 2. In one embodiment, one or more service providers 14 belong to a first protection group 50 and one or more different service providers 14 belong to a second protection group 52, although the present invention contemplates any number of protection groups according to particular needs. Protection groups 50 and 52 may each have any suitable number of member service providers 14 and protection groups 50 and 52 may have the same or a different number of member service providers 14. The present invention further contemplates one or more service providers 14 being members of multiple protection groups, for example, both protection group 50 and protection group 52.

For each protection group 50 or 52 there exists at least one redundant service provider 14 capable of assuming some or all of the responsibilities of any other service provider 14 within its protection group 50 or 52 in response to a failure of one of these service providers 14. Service providers 14 may generally be referred to, in accordance with the scope of the present invention, as cards 14. Furthermore, redundant service providers 14 may be referred to as protection cards 14 and service providers 14 within protection groups 50 and 52 may be referred to as protected cards 14. Where there is a single protected card 14 within protection group 50 or 52 and a single protection card 14 for the protection group 50 or 52, 1+1 redundancy is provided for the protection group 50 or 52. Where there are N protected cards 14 and a single protection card 14, N+1 redundancy is provided, and where there are N protected cards 14 and X protection cards 14, N+X redundancy is provided. The present invention contemplates any suitable redundancy scheme involving protected cards 14 and protection cards 14.

Each I/O module 30 or 34 includes a multiplexer 54 or 56, respectively. When a particular protected card 14 is functioning properly, a particular service provider 14 in protection group 50 for example, multiplexer 54 allows I/O module 30 to communicate information between protected card 14 and the associated network interface using link 39. In one embodiment, each protected card 14 communicates a watchdog signal using link 38 to multiplexer 54 of associated I/O module 30. In general, the watchdog signal indicates to I/O module 30 that protected card 14 is functioning properly or at least has not experienced a failure requiring that protected card 14 be removed from service. Conversely, termination or appropriate modification of the watchdog signal indicates to I/O module 30 that protected card 14 is not functioning properly, at least in part, and is permanently or temporarily incapable of fulfilling some or all of its responsibilities within switching unit 10. Upon detecting a modification of the watchdog signal and, therefore, the failure of protected card 14, I/O module 30 communicates a signal to the protection card 14 for protection group 50 using multiplexer 54, protection bus 28, and protection I/O module 32 to inform protection card 14 of the failure.

In response, protection card 14 assumes some or all responsibilities of failed protected card 14 and begins communicating accordingly with I/O module 30 associated with failed protected card 14 using protection I/O module 32, protection bus 28, and multiplexer 54. In one embodiment, protection card 14, I/O module 30, or another suitable component of switching unit 10 instructs multiplexer 54 to begin selectively communicating data it receives from the associated network interface to protection card 14 rather than to protected card 14. Multiplexer 54 may be instructed to select the communication path to protection card 14 before, essentially simultaneous with, or after protection card 14 is informed of the failure. After replacement, repair, or other suitable modification of failed protected card 14, protection card 14 or another component of switching unit 10 may instruct multiplexer 54 to again selectively communicate data it receives from the associated network interface to protected card 14 rather than to protection card 14. In one embodiment, some or all transitions from protected card 14 to protection card 14 following failure of protected card 14, and from protection card 14 to protected card 14 following replacement, repair, or suitable modification of failed protected card 14, may be essentially seamless, such that switching unit 10 experiences little or no degradation in performance, capacity, or other characteristics as a result of these transitions.

In one embodiment, only a single protection card 14 may use protection bus 28 at any given time, which may include the entire period during which any of the protected cards 14 within switching unit 10 experiences a failure. Therefore, in response to the failure of any protected card 14 within either protection group 50 or 52, associated protection card 14 may be required to arbitrate for the use of protection bus 28. One or more protection cards 14 may arbitrate for use of protection bus 28 based on relative priority, according to the passing of a token in "round-robin" fashion, or in any other suitable manner, for example only and not by way of limitation, in a manner similar to that described in copending U.S. application Ser. No. 09/328,171 regarding arbitration for use of control bus 16.

Once any protected card 14 fails and protection bus 28 becomes occupied as a result of the failure, any remaining protection cards 14 may be unable to assume the responsibilities of any later failing protected card 14. As a result, in this particular embodiment, only a single protected card 14 may experience a failure before the performance, capacity, or other characteristics of switching unit 10 begin to degrade. However, in contrast to prior protection strategies, even an unprotected failure of one or more service providers 14 will not cause switching unit 10 to fail as a whole, since each service provider 14 need not depend on any other service providers 14 to carry out its responsibilities. Therefore, consequences of such a failure may be limited to the decrease in performance and capacity associated with the loss of one service provider 14, which might be approximately five percent in a particular implementation in which switching unit 10 supports nineteen service providers 14. Redundant protection buses 28, or separate protection buses 28 for different protection groups 50 and 52, may be provided in situations where simultaneous failure of multiple cards is considered an appreciable risk.

Control bus 16 and its associated physical layer protocol may support "bus snooping"—that is, the ability of one or more service providers 14 to receive some or all messages communicated to another specified service provider 14 or group of service providers 14 within switching unit 10. Bus snooping with respect to control bus 16 is described more fully in U.S. Pat. No. 6,425,009 and copending U.S. application Ser. No. 09/328,171. In one embodiment, protection card 14 takes advantage of this capability to receive all command, control, and administrative messages communicated using control bus 16 to protected cards 14 within its protection group 50 or 52. As a result, protection card 14 may more readily assume the responsibilities of failed protected card 14, at a minimum with respect to transmitting and receiving command, control, and administrative data using control bus 16, further contributing to an essentially seamless transition between protected card 14 and protection card 14.

Software associated with switching unit 10 may modify the ability of protection card 14 to receive messages communicated to one or more protected cards 14 at any suitable time, for any appropriate reason, and in any suitable manner in operation of switching unit 10, according to particular needs. For example, after protection card 14 assumes the responsibilities of a failed protected card 14 within its protection group 50 or 52, protection card 14 may no longer be capable of assuming the responsibilities of any other failed or later failing protected card 14 within protection group 50 or 52, and therefore may no longer need to receive messages destined for any of these formerly protected cards 14. Although the system has been described primarily with respect to protection group 50, those skilled in the art appreciate that the above description may similarly apply, where appropriate, to protection group 52 and any other protection groups in switching unit 10 without departing from the intended scope of the present invention.

Figure 3A:
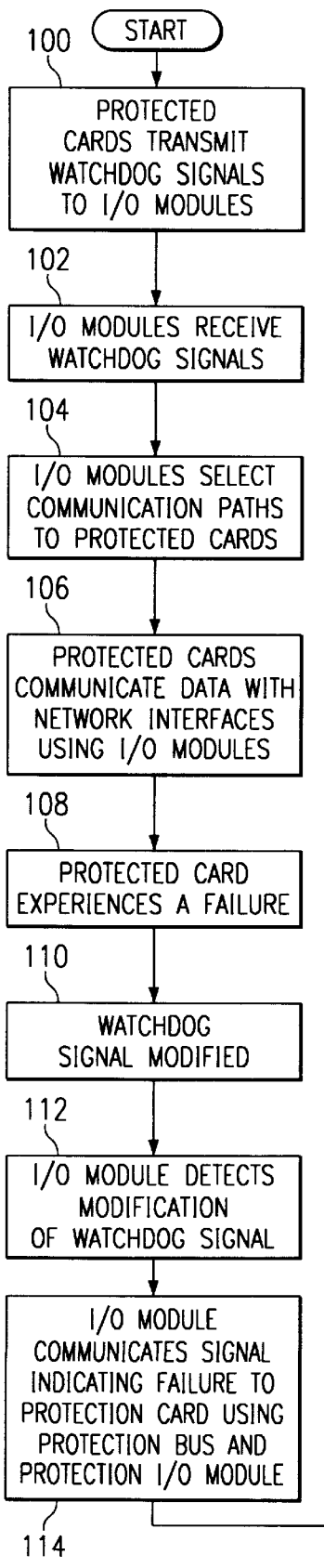
FIGS. 3A and 3B are a flow chart illustrating an exemplary method of protecting a switching unit from a failure of a card in accordance with the present invention.
Figure 3A:
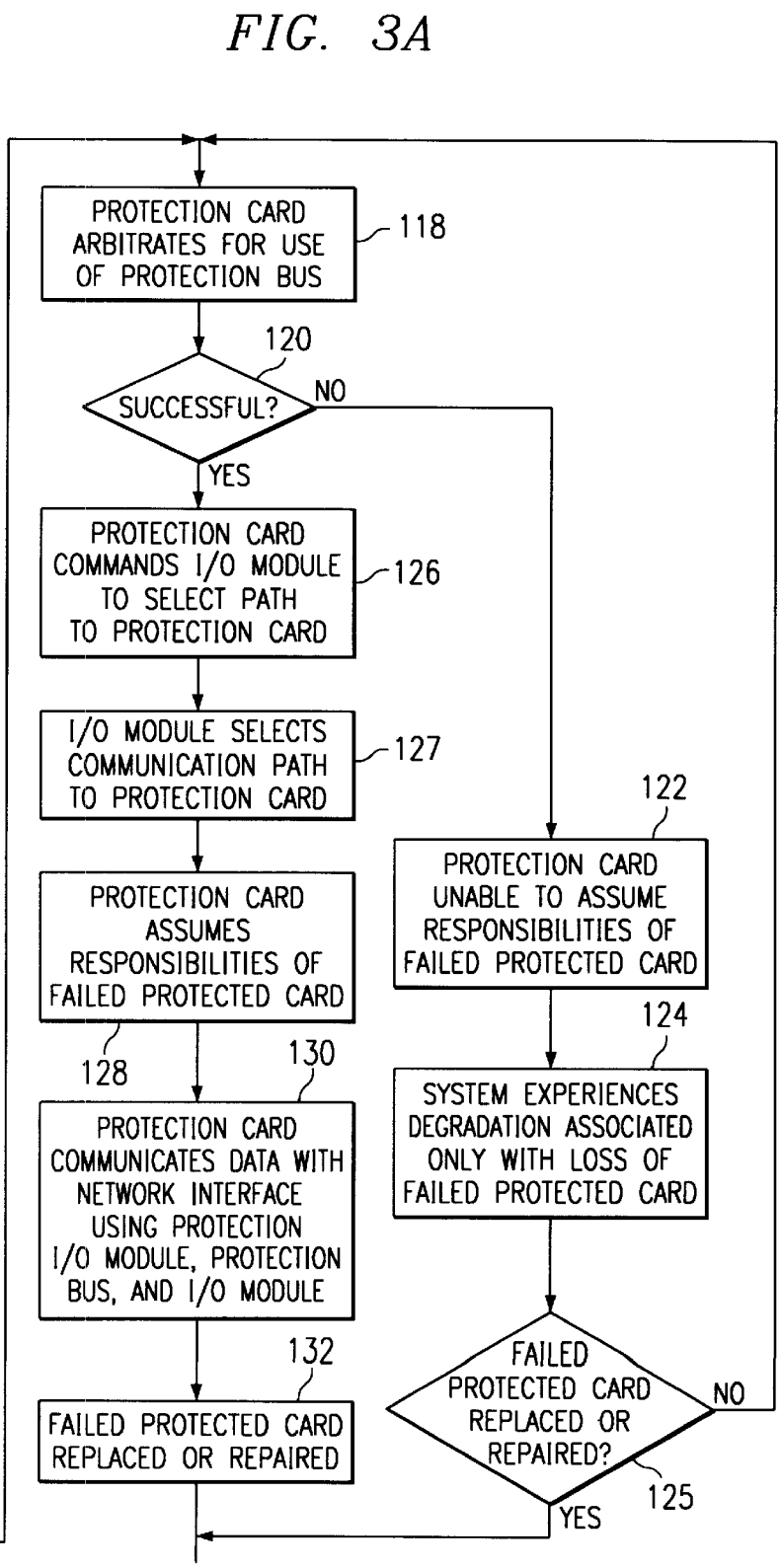
Figure 3B:
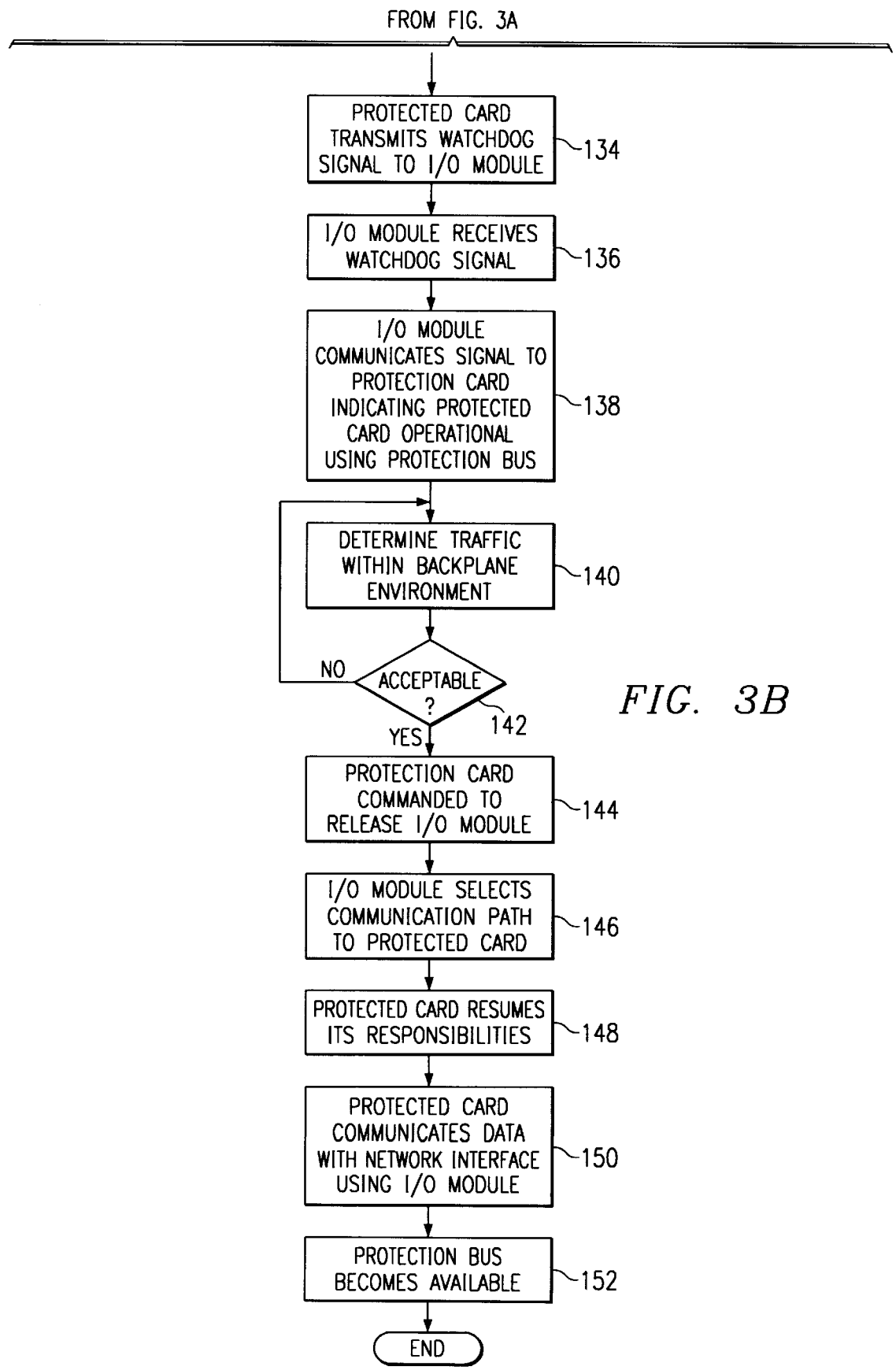

FIG. 3 is a flow chart illustrating an exemplary method of protecting the operation of switching unit 10 from a failure of a protected card 14 according to the present invention. The method will be described assuming switching unit 10 has been initialized and is operating as intended in switching digital signals between network interfaces using service providers 14 and backplane 16. Although the method will be described with respect to protection group 50, those skilled in the art appreciate that the method may apply similarly to protection group 52 and any other suitable protection groups in switching unit 10 without departing from the intended scope of the present invention.

The method begins at step 100, where protected cards 14 in protection group 50 transmit watchdog signals to associated I/O modules 30 using links 38. I/0 modules 30 receive the watchdog signals at step 102 and, in response, continue to select links 38 as communication paths from multiplexers 54 to protected cards 14 at step 104. At step 106, protected cards 14 continue to communicate data with their associated network interfaces using links 38, I/O modules 30, and links 39. A particular protected card 14 experiences a failure at step 108 and, as a result, its watchdog signal is terminated or otherwise modified in some manner at step 110. Failure of protected card 14 may be total, such that protected card 14 is unable to fulfill any of its responsibilities within switching unit 10, or only partial, such that protected card 14 is able to fulfill some but not all of its responsibilities. I/O module 30 associated with failed protected card 14 detects modification of the watchdog signal at step 112. In response, at step 114, I/O module 30 transmits a signal indicating the failure to protection card 14 for protection group 50 using protection bus 28 and protection I/O module 32.

In one embodiment, protection card 14 must arbitrate with one or more other protection cards 14 for use of protection bus 28 at step 118. If protection card 14 is unsuccessful at step 120, meaning that protection card 14 did not win the arbitration for use of protection bus 28, the method proceeds to step 122, where protection card 14 is unable to assume the responsibilities of failed protected card 14. Consequently, at step 124, switching unit 10 may experience a degradation in performance, capacity, or other characteristics associated with the loss to switching unit 10 of failed protected card 14. However, as discussed above, since in one embodiment each protected card 14 operates independently of other protected cards 14, switching unit 10 does not experience a total failure in response to the failure of protected card 14. If failed protected card 14 has not been replaced, repaired, or otherwise returned to service at step 125, the method returns to step 118, where protection card 14 continues to arbitrate for the opportunity to use protection bus 28. If failed protected card 14 has been replaced, repaired, or otherwise returned to service at step 125, the method proceeds to step 134.

If protection card 14 has successfully arbitrated for the use of protection bus 28 at step 120, protection card 14 will command I/O module 30 at step 126 to select the communication path to protection card 14. At step 127, in response to the command, I/O module 30 selects the communication path to protection card 14, instead of the path to failed protected card 14, using multiplexer 54. Protection card 14 will assume at least some responsibilities of failed protected card 14 at step 128 and, at step 130, protection card 14 begins communicating data with the network interface associated with failed protected card 14 using protection I/O module 32, protection bus 28, and I/O module 30. After failed protected card 14 is replaced, repaired, or otherwise made available for service at step 132, protected card 14 once again transmits the watchdog signal to I/O module 30 at step 134. I/O module receives the watchdog signal at step 136 and in response transmits a signal to protection card 14 at step 138 indicating that protected card 14 is capable of resuming its responsibilities. Software within or otherwise associated with switching unit 10 is also made aware that protected card 14 has become available for service.

In response, at step 140, the software or another suitable component of switching unit 10 begins the graceful introduction of protected card 14 by determining whether traffic on backplane 18 or otherwise within the backplane environment of switching unit 10 is acceptably low or otherwise suitable for the switchover from protection card 14 to protected card 14. If the traffic is not acceptable due to its volume, its characteristics, or any other suitable factor at step 142, the method returns to step 140. The method loops in this manner until the traffic is deemed acceptable at step 142, in which case the software or another suitable component of switching unit 10 commands protection card 14 to release I/O module 30 at step 144. In response, at step 146, I/O module 30 selects the communication path to protected card 14, instead of the path to protection card 14, using multiplexer 54.

Protected card 14 resumes its responsibilities at step 148 and, at step 150, protected card 14 begins to communicate data with its network interface using I/O module 30. Protection bus 28 becomes available once again for protection of another failed protected card 14 at step 152, and the method ends. The method may operate in a continuous loop during operation of switching unit 10 to protect switching unit 10 against the failure of one or more protected cards 14. In one embodiment, transitions from protected card 14 to protection card 14 following failure of protected card 14, and from protection card 14 back to protected card 14 following replacement, repair, or suitable modification of failed protected card 14, may be essentially seamless such that switching unit 10 experiences little no degradation in performance, capacity, and other characteristics as a result of these transitions.

Although the present invention has been described with several embodiments, a plethora of changes, substitutions, variations, alterations, and modifications may be suggested to one skilled in the art, and it is intended that the invention encompass all such changes, substitutions, variations, alterations, and modifications as fall within the spirit and scope of the appended claims.

What is claimed is:

1. A telecommunications device, comprising:
 a protection bus;
 at least one protected card;
 an I/O module for the protected card, the I/O module coupled to the protected card and the protection bus, the I/O module operable to communicate data between the protected card and an associated network interface, the protected card operable to communicate a watchdog signal to the I/O module, the I/O module operable to detect a modification in the watchdog signal to detect a failure of the protected card;
 at least one protection card;
 a protection I/O module for the protection card, the protection I/O module coupled to the protection card and the protection bus; and
 the protection card operable to assume at least some responsibilities of the protected card in response to the failure of the protected card, the protection I/O module operable to communicate the data between the protection card and the I/O module for the protected card using the protection bus, the I/O module for the protected card operable to communicate the data with the network interface associated with the protected card to protect the device from the failure.

2. The device of claim 1, further comprising N−1 additional protected cards, the protected card and additional protected cards forming a protection group associated with the protection card and having N members.

3. The device of claim 2, further comprising X−1 additional protection cards, the protection card and the additional protection cards cooperating to provide N+X redundancy for the protection group.

4. The device of claim 1, further comprising:
at least one second protected card;
a second I/O module for the second protected card, the second I/O module coupled to the second protected card and the protection bus, the second I/O module operable to communicate second data between the second protected card and an associated network interface;
at least one second protection card;
a second protection I/O module for the second protection card, the second protection I/O module coupled to the second protection card and the protection bus; and
the second protection card operable to assume at least some responsibilities of the second protected card in response to a failure of the second protected card, the second protection I/O module operable to communicate the second data between the second protection card and the second I/O module using the protection bus, the second I/O module for the second protected card operable to communicate the second data with the network interface associated with the second protected card.

5. The device of claim 4, further comprising N−1 additional second protected cards, the second protected card and additional second protected cards forming a second protection group associated with the second protection card and having N members.

6. The device of claim 4, wherein the network interface for the protected card is of a different type than the network interface for the second protected card.

7. The device of claim 1, wherein the I/O module for the protected card comprises a multiplexer coupled to the protected card and to the protection bus, the multiplexer operable to selectively communicate the data between the protection I/O module and the network interface rather than between the protected card and the network interface in response to the failure.

8. An I/O module within a telecommunications device, comprising:
a multiplexer coupled to a protected card and to a protection bus;
the multiplexer operable to selectively communicate data between the protected card and an associated network interface if the protected card is capable of performing its responsibilities; and
the multiplexer operable to selectively communicate data between a protection I/O module and the network interface using a protection bus if the protected card is not capable of performing its responsibilities, the protection I/O module coupled to the protection card and to the protection bus, the protection card operable to assume at least some of the responsibilities of the protected card, the module operable to receive a watchdog signal from the protected card, the module operable to detect a modification of the watchdog signal to detect a failure of the protected card.

9. The module of claim 8, wherein the protected card is one of N protected cards in a protection group associated with the protection card.

10. The module of claim 9, wherein the protection card is one of X protection cards associated with the protection group that cooperate to provide N+X redundancy for the protection group.

11. A method of protecting the operation of a telecommunications device from a failure of a protected card within the device, comprising:
communicating data between the protected card and an associated network interface using an I/O module;
communicating a watchdog signal from the protected card to the I/O module;
detecting a modification of the watchdog signal to detect a failure of the protected card;
in response to the failure, communicating data between a protection I/O module and the network interface using a protection bus and the I/O module, the protection I/O module coupled to a protection card; and
assuming at least some responsibilities of the protected card using the protection card to protect the operation of the device from the failure.

12. The method of claim 11, wherein the protected card is one of N protected cards in a protection group associated with the protection card.

13. The method of claim 12, wherein the protection card is one of X protection cards associated with the protection group that cooperate to provide N+X redundancy for the protection group.

14. The method of claim 11, further comprising:
communicating second data between a second protected card and an associated network interface using a second I/O module;
detecting a second failure of the second protected card;
in response to the second failure, communicating the second data between a second protection I/O module and the network interface associated with the second protected card using the protection bus and the second I/O module, the second protection I/O module coupled to a second protection card; and
assuming at least some responsibilities of the second protected card using the second protection card.

15. The method of claim 14, wherein the second protected card is one of N second protected cards in a second protection group associated with the second protection card.

16. The method of claim 14, wherein the network interface for the protected card is of a different type than the network interface for the second protected card.

17. The method of claim 11, wherein the I/O module for the protected card comprises a multiplexer coupled to the protected card and to the protection bus, the method further comprising selectively communicating data either between the protected card and the network interface or between the protection I/O module and the network interface according to a failure status of the protected card.

18. Logic for protecting the operation of a telecommunications device from a failure of a protected card within the device, the logic encoded in medial and operable to:
communicate data between the protected card and an associated network interface using an I/O module;

communicate a watchdog signal from the protected card to the I/O module;

detect a modification of the watchdog signal to detect a failure of the protected card;

in response to the failure, communicate data between a protection I/O module and the network interface using a protection bus and the I/O module, the protection I/O module coupled to a protection card; and assume at least some responsibilities of the protected card using the protection card to protect the operation of the device from the failure.

19. The logic of claim 18, wherein the protected card is one of N protected cards in a protection group associated with the protection card.

20. The logic of claim 19, wherein the protection card is one of X protection cards associated with the protection group that cooperate to provide N+X redundancy for the protection group.

21. The logic of claim 18 further operable to:

communicate second data between a second protected card and an associated network interface using a second I/O module;

detect a second failure of the second protected card;

in response to the second failure, communicate the second data between a second protection I/O module and the network interface associated with the second protected card using the protection bus and the second I/O module, the second protection I/O module coupled to a second protection card; and assume at least some responsibilities of the second protected card using the second protection card.

22. The logic of claim 21, wherein the second protected card is one of N second protected cards in a second protection group associated with the second protection card.

23. The logic of claim 21, wherein the network interface for the protected card is of a different type than the network interface for the second protected card.

24. The logic of claim 18, wherein the I/O module for the protected card comprises a multiplexer coupled to the protected card and to the protection bus, the logic further operable to selectively communicate data either between the protected card and the network interface or between the protection I/O module and the network interface according to a failure status of the protected card.

25. A telecommunications device, comprising:

means for communicating data between a protected card and an associated network interface using an I/O module;

means for communicating a watchdog signal from the protected card to the I/O module;

means for detecting a modification of the watchdog signal to detect a failure of the protected card;

means for, in response to the failure, communicating data between a protection I/O module and the network interface using a protection bus and the I/O module, the protection I/O module coupled to a protection card; and means for assuming at least some responsibilities of the protected card using the protection card to protect the operation of the device from the failure.

* * * * *